United States Patent
Sohn

(10) Patent No.: US 11,907,120 B2
(45) Date of Patent: Feb. 20, 2024

(54) COMPUTING DEVICE FOR TRANSCEIVING INFORMATION VIA PLURALITY OF BUSES, AND OPERATING METHOD OF THE COMPUTING DEVICE

(71) Applicant: Samsung Electronics Co., Ltd., Suwon-si (KR)

(72) Inventor: Keonhan Sohn, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/726,049

(22) Filed: Apr. 21, 2022

(65) Prior Publication Data
US 2022/0382675 A1    Dec. 1, 2022

(30) Foreign Application Priority Data
May 31, 2021   (KR) .................. 10-2021-0070109

(51) Int. Cl.
*G06F 13/42*   (2006.01)
*G06F 12/06*   (2006.01)

(52) U.S. Cl.
CPC ...... *G06F 12/0646* (2013.01); *G06F 13/4208* (2013.01); *G06F 2212/1016* (2013.01)

(58) Field of Classification Search
CPC .. G06F 13/4208; G06F 13/4204; G06F 13/42; G06F 13/40; G06F 13/404; G06F 13/16; G06F 13/1631; G06F 13/36; G06F 13/38; G06F 13/28
See application file for complete search history.

(56) References Cited

U.S. PATENT DOCUMENTS

| | | | |
|---|---|---|---|
| 7,065,639 B2 | 6/2006 | Chan et al. | |
| 7,296,143 B2 | 11/2007 | Gaskins et al. | |
| 7,707,354 B2 | 4/2010 | Lee et al. | |
| 7,761,653 B2 | 7/2010 | Lee et al. | |
| 9,086,989 B2 | 7/2015 | Gupta et al. | |
| 2007/0106884 A1* | 5/2007 | Bracamontes | G06F 9/328 712/227 |
| 2009/0113175 A1* | 4/2009 | Wong | G06F 9/328 712/E9.016 |
| 2009/0144527 A1* | 6/2009 | Nakata | H04L 49/901 712/221 |
| 2013/0054885 A1* | 2/2013 | Choi | G11C 8/16 711/149 |
| 2013/0111181 A1* | 5/2013 | Kothamasu | G06F 12/0284 711/202 |
| 2017/0153993 A1* | 6/2017 | Palmer | G06F 15/17375 |
| 2021/0034364 A1* | 2/2021 | Li | G06F 9/3824 |

* cited by examiner

*Primary Examiner* — Tracy A Warren
(74) *Attorney, Agent, or Firm* — Harness, Dickey & Pierce, P.L.C.

(57) ABSTRACT

A computing device includes a host device and a storage device. The host device is configured to receive instruction information via a code bus based on a code address comprised in a code address map of particular address maps and receive data via a system bus that is separate from the code bus based on a data address included in a data address map. The storage device is configured to store target instruction information via the system bus and provide the target instruction information to the host device via the code bus in response to a request from the host device for an object code address included in the code address map and corresponding to the target instruction information.

20 Claims, 10 Drawing Sheets

COMPUTING DEVICE FOR TRANSCEIVING INFORMATION VIA PLURALITY OF BUSES, AND OPERATING METHOD OF THE COMPUTING DEVICE

CROSS-REFERENCE TO RELATED APPLICATION

This application is based on and claims priority under 35 U.S.C. § 119 to Korean Patent Application No. 10-2021-0070109, filed on May 31, 2021 in the Korean Intellectual Property Office, the disclosure of which is incorporated by reference herein in its entirety.

BACKGROUND

The inventive concepts relate to computing devices, and more particularly, to computing devices configured to transceive information via a plurality of buses.

Systems may include a plurality of function blocks for providing various functions and high performance. Each of the function blocks of the systems may perform designed and/or programmed operations, and communicate with other function blocks. In this case, each function block may transceive instruction information or data via one bus.

When information is transceived via one bus, in a process of sequentially performing a series of commands, a bottleneck phenomenon in a data path or delay phenomenon at a memory location may occur. Thus, a delay or error in an operation of the computing device may occur and the performance of the systems may be affected.

SUMMARY

Provided is an efficient information transceiving method using an improved computing device, which uses limited bus resources (e.g., uses only limited bus resources) when pieces of information are transceived via a plurality of buses.

According to some example embodiments, a computing device may include a host device and a storage device. The host device may be configured to receive instruction information via a code bus based on a code address included in a code address map of particular address maps, and receive data via a system bus that is separate from the code bus based on a data address included in a data address map. The storage device may be configured to store target instruction information via the system bus, and provide the target instruction information to the host device via the code bus in response to a request from the host device for an object code address included in the code address map and corresponding to the target instruction information.

In some example embodiments, a bus matrix may include a first bus connected to a storage device and a second bus. The first bus may be configured to transceive address information included in a first address map of particular address maps. The second bus may be configured to transceive address information included in a second address map of the particular address maps. The first bus may be configured to store object information received from an external storage device and mapped to a first address included in the first address map. The second bus may be configured to provide the object information from the storage device to a host device, in response to the object information being requested from the host device based on a second address that is separate from the first address and included in the second address map.

In some example embodiments, an operation method of a computing device including a host device and a storage device may include receiving object information, to which an object data address included in a data address map of particular address maps has been mapped, via a system bus; storing the object information to the storage device; requesting an object code address included in a code address map, from the host device to the storage device; and providing the object information in response to the request to the host device via a code bus that is separate from the system bus.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments of the inventive concepts will be described in detail with reference to the accompanying drawings.

Figure 1:
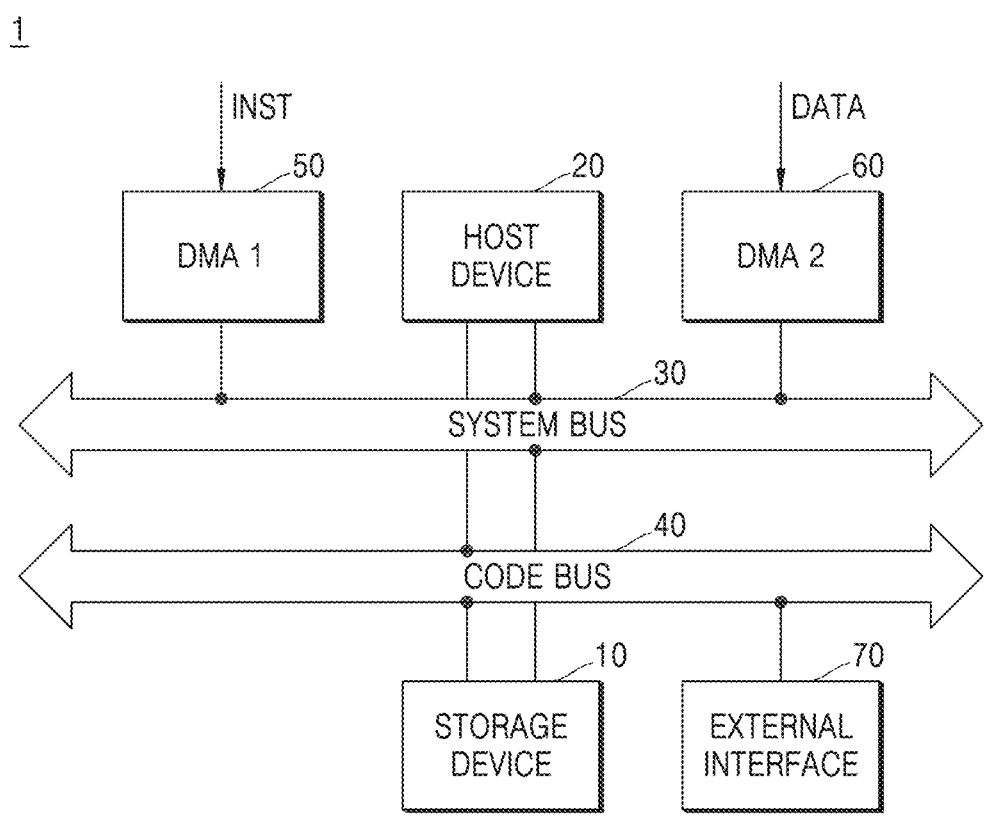
FIG. 1 is a schematic block diagram of a configuration of a computing device according to some example embodiments.

FIG. 1 is a schematic block diagram of a configuration of a computing device 1 according to some example embodiments.

Referring to FIG. 1, the computing device 1 of the inventive concepts may transceive information via a plurality of buses. The computing device 1 may be configured with a stationary computing system such as a desktop computer, a workstation, and a server, or with a portable computing system such as a laptop computer. As illustrated in FIG. 1, the computing device 1 may include a storage device 10, a host device 20, a plurality of direct memory access devices (DMA) 50 and 60, and an external interface 70, and each component may transceive information by being connected to at least one bus.

The storage device 10, the host device 20, a first DMA (DMA 1) 50, and a second DMA (DMA 2) 60 may be connected to each other via a system bus 30, and the storage device 10, the host device 20, and the external interface 70 may be connected to each other via a code bus 40. Although in the computing device 1 according to some example embodiments, including the example embodiments shown in FIG. 1, different DMAs may provide instruction information INST and data DATA to the system bus 30, the computing device 1 according to the inventive concepts is not limited thereto, and one DMA may also receive the instruction information INST and the data DATA. When one DMA receives the instruction information INST and the data DATA, the instruction information INST and the data DATA may be provided to the system bus 30 by allocating an address corresponding to each of the instruction information INST and the data DATA. Accordingly, the computing device 1 may include at least one direct memory access device (DMA) that is configured to provide (where "providing" or the like may be referred to herein interchangeably as "transmitting" or the like), to the storage device 10, instruction information INST and data DATA that is received from an external storage device.

The instruction information INST may include code information for performing a series of computation operations by the host device 20 based on the data DATA stored in the storage device 10, and may include, for example, code information for performing a secure boot and a test operation.

The host device 20 may be referred to as a processing unit, and may include a core such as a micro-processor, an application processor (AP), a digital signal processor (DSP), and a graphics processing unit (GPU), which are capable of executing a variety of sets of instructions (for example, Intel Architecture-32 (IA-32)), 64-bit extensions to IA-32, x86-64, PowerPC, scalable processor architecture (SPARC), microprocessor without interlocked pipeline stages (MIPS), Acorn reduced instruction set computer (RISC) machine (ARM), Intel Architecture-62 (IA-64), etc.).

The host device 20 of the inventive concepts may load the data DATA stored in the storage device 10 by accessing the storage device 10 via the system bus 30, and may load the instruction information INST stored in the storage device 10 by accessing the storage device 10 via the code bus 40.

The storage device 10 may store the instruction information INST and the data DATA, and further include a program used by the host device 20 for routing a bus. The program may include a plurality of commands executable by the host device 20, and the plurality of commands included in the program may allow the host device 20 to perform operations of routing a bus according to some example embodiments.

The storage device 10 may include a volatile memory such as static random access memory (RAM) (SRAM) and dynamic RAM (DRAM), a flash memory, and a non-volatile memory such as resistance RAM (RRAM), magnetic resistive RAM (MRAM), and phase change RAM (PRAM). Hereinafter, the storage device 10 is described as SRAM, but it may be understood that the technical idea of the inventive concepts is not limited thereto.

The storage device 10 may store the data DATA and the instruction information INST to be processed by the host device 20, or also store the data DATA processed by the host device 20. In other words, the host device 20 may generate the data DATA by processing the data DATA stored in the storage device 10 according to the instruction information INST, and may also store the generated data DATA in a storage device.

The system bus 30 and the code bus 40 may have discrete (e.g., separate) physical spaces, and may include also transmission channels through which information is transmitted. According to some example embodiments, the data DATA stored in the storage device 10 may be provided to the host device 20, and code information stored in the storage device 10 may be provided to the host device 20 via the code bus 40. In other words, the storage device 10 and the host device 20 of the inventive concepts may transceive information corresponding to each bus via a plurality of buses, and accordingly, may reduce or prevent a bottleneck phenomenon, compared to some example embodiments in which information is transceived via one bus.

The system bus 30 may be connected to a plurality of DMAs, and each DMA may provide the instruction information INST and the data DATA from an external memory device to the system bus 30.

The system bus 30 may include an address bus, a data bus, and a control bus. When the data DATA is provided from the storage device 10 to the host device 20 or is stored in the storage device 10, the address bus may include a bus via which an address corresponding to the data DATA is transceived. The control bus may include a bus transceiving control signals for controlling the data bus and the address bus. The system bus 30 may be advantageous for storing a large amount of data DATA from the DMAs in the storage device 10, but may have a slower transmission speed of instantaneously fetching the data DATA to the host device 20, compared to the code bus 40.

The code bus 40 configured as a discrete bus (e.g., separate bus) from the system bus 30 may include a bus for fetching instruction information INST to the host device 20 via the storage device 10 or the external interface 70, and may have a faster transmission speed in instantaneously fetching instruction information INST, compared to the system bus 30.

The DMA 1 50 and DMA 2 60 may, independently of the host device 20, perform an operation of storing the instruction information INST and the data DATA in the storage device 10, and may store the instruction information INST and the data DATA in the storage device 10 by loading information of the external memory device and allocating an address corresponding to the storage device 10.

As an example, the DMA 1 50 may receive the instruction information INST from the external memory device before the host device 20 performs a series of operations, and store the received instruction information INST in the storage device 10 by allocating an address corresponding to the storage device 10 to the received instruction information INST. Similarly, the DMA 2 60 may receive the data DATA from the external memory device, and may store the received data DATA by allocating an address corresponding to the storage device 10 to the received data DATA.

The host device 20 of the computing device 1 of the inventive concepts may receive the instruction information INST via the code bus 40 based on a code address included in a code address map of particular (or, alternatively, predefined) address maps, and may receive the data DATA via the system bus 30 discrete from the code bus 40 based on a data address included in the data address map. In this case, the storage device 10 may store target instruction information via the system bus 30, and when an object code address corresponding to the target instruction information (e.g., a particular code address ADDR_CODE corresponding to the target instruction information, mapped to the target instruction information, or to which the target instruction information is mapped, where the particular code address ADDR_CODE is one of the code addresses ADDR_CODE included in the code address map that is also the code address map of the code address upon which the receipt of the instruction information INST at the host device 20 is based) is requested by the host device 20 (e.g., in response to a request by the host device for an object code address corresponding to the target instruction information, in response to receiving a request from the host device for an object code address corresponding to the target instruction information, etc.), may provide the target instruction information to the host device 20 via the code bus 40. As described herein, a request for a code address that corresponds to instruction information may be and/or may include a request for information that corresponds to a particular code address that may be specified in the request (e.g., a request from the host device 20 for an object code address corresponding to target instruction information may include a request for information corresponding to a specific object code address ADDR_CODE that is specified in the request). Accordingly, the host device 20 may receive the target instruction information based on the object code address ADDR_CODE included in the code address map.

In other words, according to some example embodiments of the inventive concepts, even when a discrete address map (e.g., a separate address map) is allocated to each of a plurality of buses, the computing device 1 may operate by (e.g., based on) differentiating a type of a bus via which information has been transmitted when information is stored in the storage device 10, from a type of a bus via which information is provided from the storage device 10 to the host device 20. As an example, the computing device 1 of the inventive concepts may store information via the system bus 30 which is better for storing information when information is stored in the storage device 10, and may transmit information via the code bus 40 for providing information at a fast transmission speed when information is provided to the host device 20.

Figure 2:
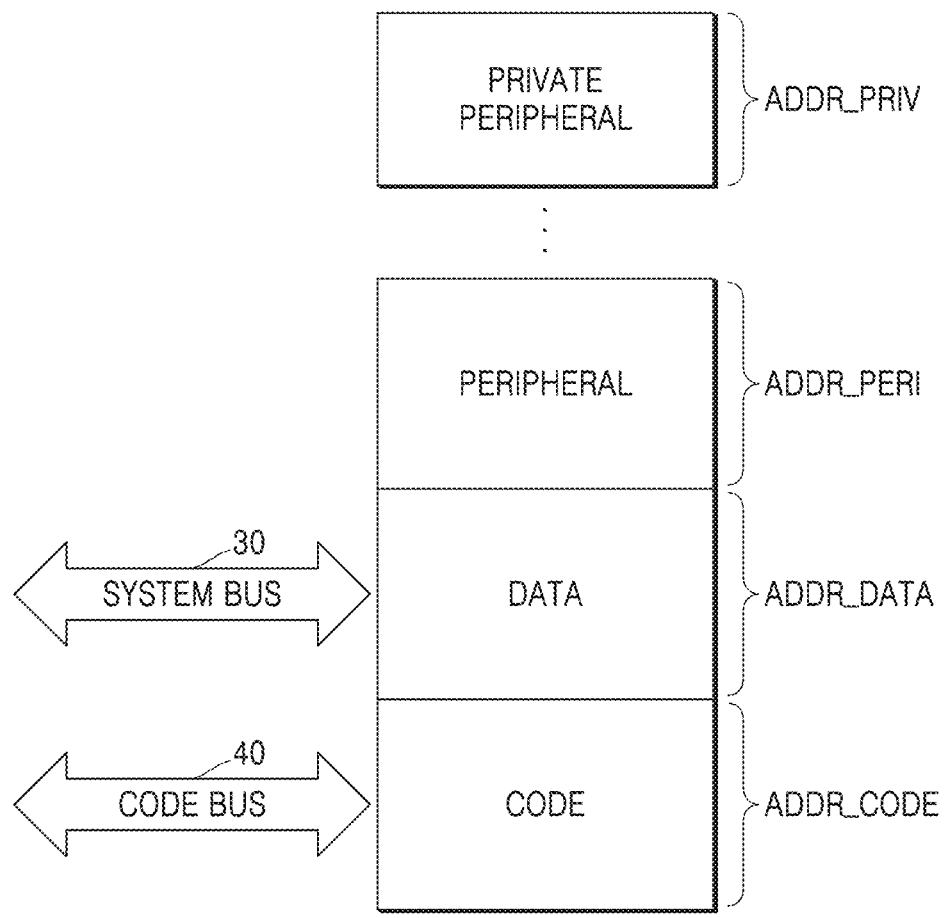
FIG. 2 is a diagram of an address map, which is designated in advance, according to some example embodiments.

FIG. 2 is a diagram of an address map, which is designated in advance, according to some example embodiments.

In the computing device requiring a high level of security, a bus, which is open according to an address requested by the host device 20, may be particular (or, alternatively, pre-defined) in advance by the address map. Referring to FIG. 2, the address map may include the code address map, the data address map, a peripheral address map, a private peripheral address (e.g., ADDR_PRIV) map, and buses respectively corresponding to address maps may be open.

As an example, when the host device 20 requests information from an address included in the code address map of a particular (or, alternatively, pre-defined) address map, the information may be provided to the host device 20 via the code bus 40. To the contrary, when the host device 20 requests information from an address included in the data address map of the address maps, the information may be provided to the host device 20 via the system bus 30.

In addition, when information from a DMA or the external interface 70 is stored in the storage device 10, an address may be determined according to a bus via which the information is provided to the storage device 10. As an example, when the instruction information INST or the data DATA is stored in the storage device 10 via the system bus 30, a DMA may allocate an address included in the data address map to the instruction information INST or the data DATA, and store the allocated address in the storage device 10.

In other words, according to a particular (or, alternatively, pre-defined) address map, because bus information to transceive information is stored in the allocated address, the computing device may determine a type of a bus via which information is provided from the storage device 10 to the host device 20 according to a type of a bus via which the information has been transmitted when the information is stored in the storage device 10.

Figure 3:
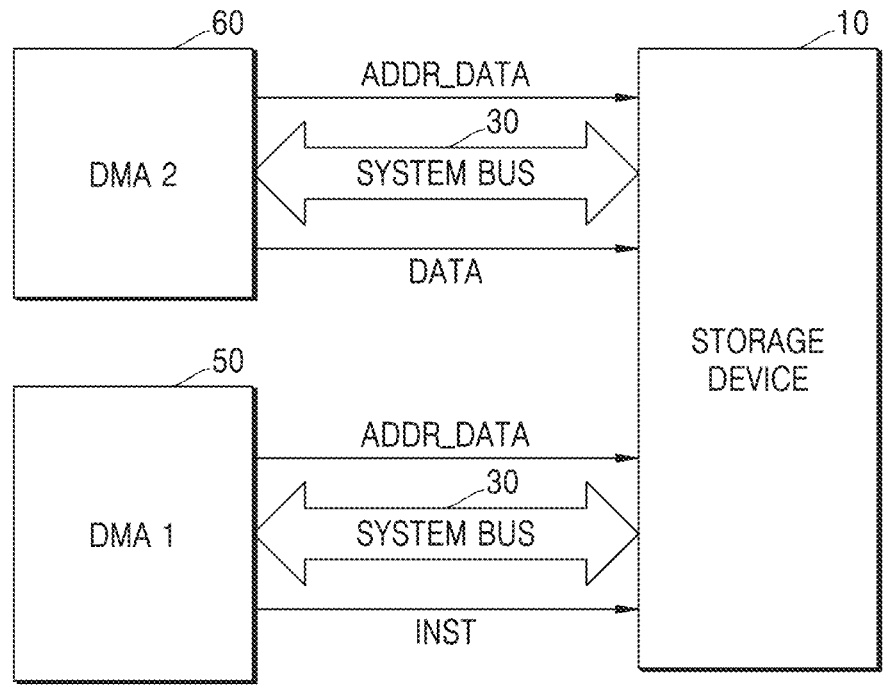
FIG. 3 is a diagram of an example in which a computing device receives instruction information and data via a system bus, according to some example embodiments.

FIG. 3 is a diagram of an example in which a computing device receives the instruction information INST and the data DATA via the system bus 30, according to some example embodiments.

Referring to FIG. 3, the storage device 10 may receive the instruction information INST and the data DATA from the DMA 1 50 and the DMA 2 60, respectively. The DMA 1 50 may map the instruction information INST from the external memory device to a data address ADDR_DATA, and provide the mapped instruction information INST to the storage device 10. The DMA 2 60 may map the data DATA from the external memory device to the data address ADDR_DATA, and provide the mapped data DATA to the storage device 10. In other words, the DMA 1 50 may not map the instruction information INST to the code address ADDR_CODE for storing the instruction information INST in the storage device 10, but may map the instruction information INST to the data address ADDR_DATA and store the mapped instruction information INST in the storage device 10. Accordingly, the computing device 1 may include at least one direct memory access device (DMA) that is configured to provide, to the storage device 10, instruction information INST and data DATA that is received from an external storage device, where the at least one DMA is configured to map the instruction information INST and the data DATA received from the external storage device to the data address ADDR_DATA, and provide the instruction information INST and the data DATA, to which the data address ADDR_DATA has been mapped and/or which have been mapped to the data address ADDR_DATA, to the storage device 10 via the system bus 30. It will be understood that, when first elements are described herein as being mapped to second elements, the first elements may be referred to as being elements to which the second elements are mapped.

The DMA 1 50 and the DMA 2 60 may store the instruction information INST and the data DATA in the storage device 10 via the system bus 30, respectively. As an example, the DMA 1 50 and the DMA 2 60 may provide the instruction information INST and the data DATA to the storage device 10 via the data bus included in the system bus 30, and may provide an address mapped to the instruction information INST and the data DATA to the storage device 10 via the address bus included in the system bus 30. In this case, the computing device may control the storage device 10 so that the data DATA and the instruction information INST mapped to the address via the control bus included in the system bus 30 are written in the storage device 10.

According to some example embodiments, the storage device 10 may store the instruction information INST in advance before (e.g., prior to) storing the data DATA from the external memory device. As an example, the computing device may receive the instruction information INST in advance from the external memory device via the system bus 30 before performing a secure boot, and then, may receive the data DATA for performing the secure boot.

According to some example embodiments, the instruction information INST and the data DATA may be stored in different memory regions from each other of an identical external memory device, and be stored in the storage device 10 via one DMA.

Figure 4:
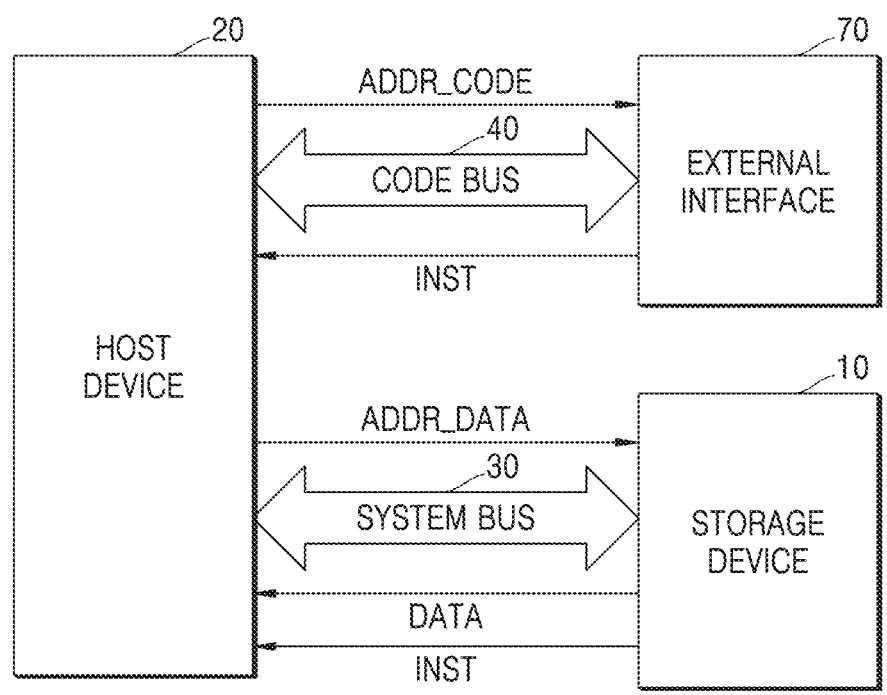
FIG. 4 is a diagram of an example in which a computing device according to some example embodiments transceives instruction information and data via different buses from each other.

FIG. 4 is a diagram of an example in which a computing device according to some example embodiments transceives the instruction information INST and the data DATA via different buses from each other.

Referring to FIG. 4, the host device 20 may load the instruction information INST and the data DATA based on an address included in different address maps from each other. The host device 20 may call information corresponding to the code address ADDR_CODE for loading the instruction information INST, and the computing device according to some example embodiments may load the instruction information INST from an external device discrete from the storage device 10 via the external interface 70. In other words, the storage device 10 of the computing device according to some example embodiments may be connected to the system bus 30 (e.g., may be connected to only the system bus 30), and the code bus 40 may provide the instruction information INST from the external interface 70 corresponding to the code address map to the host device 20.

Because the instruction information INST stored in the storage device 10 via the system bus 30 is stored with the data address ADDR_DATA mapped thereto, the host device 20 according to some example embodiments may load the instruction information INST via the system bus 30 by calling the data address ADDR_DATA mapped to the instruction information INST. In other words, the host device 20 according to some example embodiments may request the data DATA and the instruction information INST via the system bus 30 based on the data address ADDR_DATA, and the storage device 10 may provide the data DATA and the instruction information INST via the system bus 30.

Accordingly, when the instruction information INST is stored in the storage device 10 according to some example embodiments, the computing device may provide the instruction information INST to the host device 20 via the system bus 30 at a slow fetching speed, compared to the code bus 40.

When a bus transceiving information corresponding to a particular (or, alternatively, pre-defined) address map is designated, in the computing device according to some example embodiments, a bus used for storing information in the storage device 10 may be different from a bus used for providing information from the storage device 10 to the host device 20. In this case, the bus used for performing each operation may be determined according to a type of information and a situation, and as an example, a bus via which information is to be transceived by a memory controller included in the storage device 10 may be determined.

Figure 5:
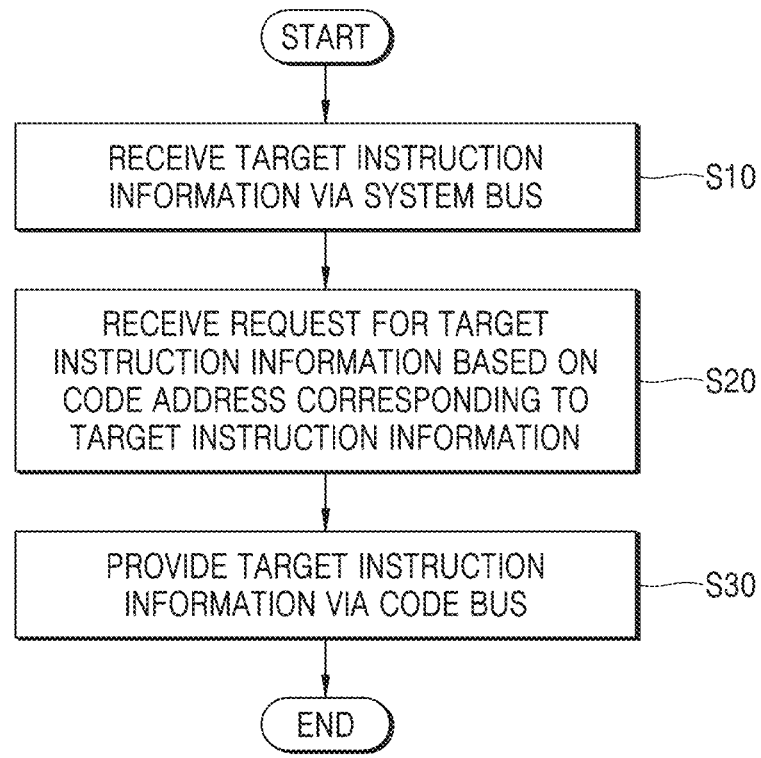
FIG. 5 is a flowchart of an operation method of a computing device of the inventive concepts.

FIG. 5 is a flowchart of an operation method of a computing device of the inventive concepts.

Referring to FIG. 5, when the computing device of the inventive concepts stores target instruction information in the storage device 10 and provides the target instruction information to the host device 20, the computing device may transceive the target instruction information via different buses from each other. The target instruction information may be stored in the storage device 10 from the external memory device for performing an object operation by the host device 20, and may include code information provided to the host device 20.

When the computing device according to some example embodiments stores the target instruction information in the storage device 10, an address corresponding to a bus via which the data DATA is transceived, of the particular (or, alternatively, pre-defined) address maps may be mapped. According to some example embodiments of FIG. 2, the code address map and the data address map of the particular (or, alternatively, pre-defined) address map may include different address regions from each other. As an example, the code address map may be configured as address regions '0x0000_0000' through '0x1FFF_FFFF', and the data address map may be configured as address regions '0x2000_0000' through '0x3FFF_FFFF'.

The storage device 10 may receive the target instruction information (also referred to herein as object information), to which the data address ADDR_DATA (also referred to herein as an object data address comprised in a data address of particular or pre-defined address maps) is mapped via the system bus 30, from the external memory device (S10) via the system bus 30. The received target instruction information may be stored in the storage device 10, and S10 may include storing the target instruction information to (e.g., in) the storage device 10. In some example embodiments, the target instruction information may be mapped to a particular data address ADDR_DATA or the particular data address ADDR_DATA may be mapped to the target instruction information. In some example embodiments, a particular data address ADDR_DATA that is mapped to target instruction information may be referred to herein as an "object data address" that is included in the data address map. The system bus 30 may include a bus which has a slow instantaneous information transmission speed, but is capable of easily storing a large amount of information from the external memory device in the storage device 10. Accordingly, the system bus 30 may be more convenient for storing information such as target instruction information (e.g., more optimized for efficiency operating speed, and/or operational performance of the computing device 1 with regard to storing target instruction information).

An DMA connected to the system bus 30 may receive the target instruction information from the external memory device, and may map one of addresses of the data address map corresponding to the system bus 30 (e.g., the object data address) to the target instruction information. As an example, an MDA may map one of addresses '0x2000_0000' through '0x3FFF_FFFF' as an object data address to the target instruction information, and provide the mapped target instruction information to the storage device 10.

The host device 20 may request the target instruction information to the storage device 10 based on the code address ADDR_CODE corresponding to the target instruction information (S20). In some example embodiments, a particular code address ADDR_CODE that corresponds to a particular target instruction information may be referred to herein as an "object code address." The request at S20 may be a request for the particular code address ADDR_CODE (e.g., request for the object code address included in the code address map and corresponding to the target instruction information). S20 may include requesting the particular code address (e.g., object code address) that is comprised in a code address map, from the host device 20 to the storage device 10. The requesting at S20 may be a request for information that corresponds to (e.g., is mapped to) a particular code address ADDR_CODE that is specified in the request. In the storage device 10 and the host device 20 of the inventive concepts may, unlike in some example embodiments, both the code bus 40 and the system bus 30 may be connected to the storage device 10, and whether the code bus 40 and the system bus 30 are open may be determined according to an address value transmitted to the address bus included in each of the code bus 40 and the system bus 30. As an example, when the host device 20 requests information of addresses '0x0000_0000' through '0x1FFF_FFFF', the code bus 40 may be open, and when the host device 20 requests information of addresses '0x2000_0000' through '0x3FFF_FFFF', the system bus 30 may be open.

In this case, the storage device 10 may receive an access request from the host device 20 with any one of '0x0000_0000' through '0x1FFF_FFFF' as the code address ADDR_CODE (e.g., may receive a request for the object code address ADDR_CODE and/or may receive a request for the target instruction information corresponding to (e.g., mapped to, or to which is mapped by) the object code address), and may read the target instruction information mapped to any one of '0x2000_0000' through '0x3FFF_FFFF' based on the code address ADDR_CODE.

The storage device 10 may provide the target instruction information corresponding to the object code address ADDR_CODE to the host device 20 via the code bus 40 (S30). For example, S30 may include providing (e.g., transmitting) the target instruction information (e.g., object information) in response to the request of S20 to the host device 20 via the code bus 40 that is separate (e.g., discrete) from the system bus 30. The code bus 40 may include a bus in which the instantaneous information transmission speed is fast and fetching the target instruction information stored in the storage device 10 to the host device 20 is convenient (e.g., more optimized for efficiency operating speed, and/or operational performance of the computing device 1 with regard to fetching target instruction information).

Accordingly, when the computing device of the inventive concepts stores the target instruction information in the storage device 10, the computing device may store the target instruction information via the system bus 30, which is convenient for storing information, and when the computing device provides the target instruction information to the host device 20, the computing device may provide the target instruction information via the code bus 40, which is convenient for fetching the instruction information, and thus, the computing device may select a bus to transceive information according to functions and situations of information.

Accordingly, based on the storage device 10 storing the target instruction information via the system bus 30 which is convenient for storing information (e.g., more optimized for storing information due to being capable of easily storing a large amount of information for storing information while having a slow instantaneous information transmission speed), and providing the target instruction information to the host device 20 via the separate (e.g., discrete) code bus 40 which is convenient for fetching instruction information (e.g., more optimized for fetching information due having fast instantaneous information transmission speed), the efficiency and/or performance of the computing device may be improved, based at least in part upon the storing and fetching (e.g., providing) target instruction information being performed via busses that are more optimized (e.g., convenient) for such functions. Based on the storage device 10 storing the target instruction information via the system bus 30 and providing the target instruction information to the host device 20 via the separate (e.g., discrete) code bus 40, the computing device 1 may be configured to reduce or prevent an occurrence of the bottleneck phenomenon in a data path or delay phenomenon at a memory location in the computing device 1. Thus, the computing device may be configured to reduce or prevent the occurrence of a delay or error in an operation of the computing device 1, and as a result the operating performance and/or operating speed of the computing device 1 may be improved.

Figure 6:
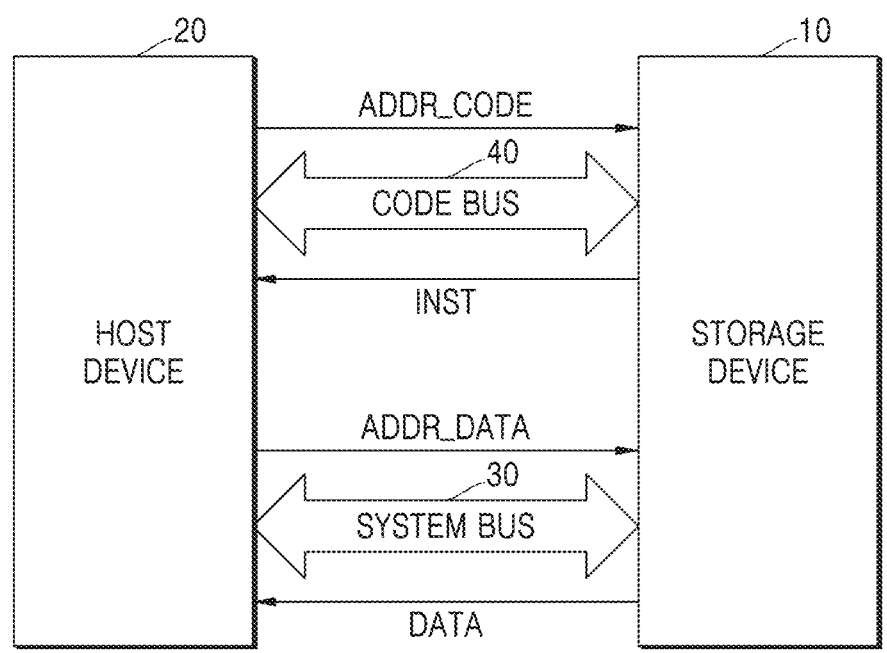
FIG. 6 is a diagram of an example, in which a host device of a computing device of the inventive concepts receives instruction information and data from one storage device via different buses from each other.

FIG. 6 is a diagram of an example, in which the host device 20 of a computing device of the inventive concepts receives the instruction information INST and the data DATA from one storage device 10 via different buses from each other.

Referring to FIG. 6, the host device 20 and the storage device 10 of the computing device may transceive information corresponding to each bus via the code bus 40 and the system bus 30. When the host device 20 requests access of the code address ADDR_CODE from the storage device 10 via the code bus 40, the storage device 10 may read the instruction information INST based on the code address ADDR_CODE. As an example, the code address ADDR_CODE may be the address of '0x0000_0000' through '0x1FFF_FFFF', and the storage device 10 may determine a memory region to access based on an offset address of the code address ADDR_CODE.

Similarly, when the host device 20 requests an access of the data address ADDR_DATA from the storage device 10 via the system bus 30, the storage device 10 may read the data DATA based on the data address ADDR_DATA. As an example, the data address ADDR_DATA may be an address of '0x2000_0000' through '0x3FFF_FFFF', and the storage device 10 may determine a memory region to access based on an offset address of the data address ADDR_DATA.

Figure 7:
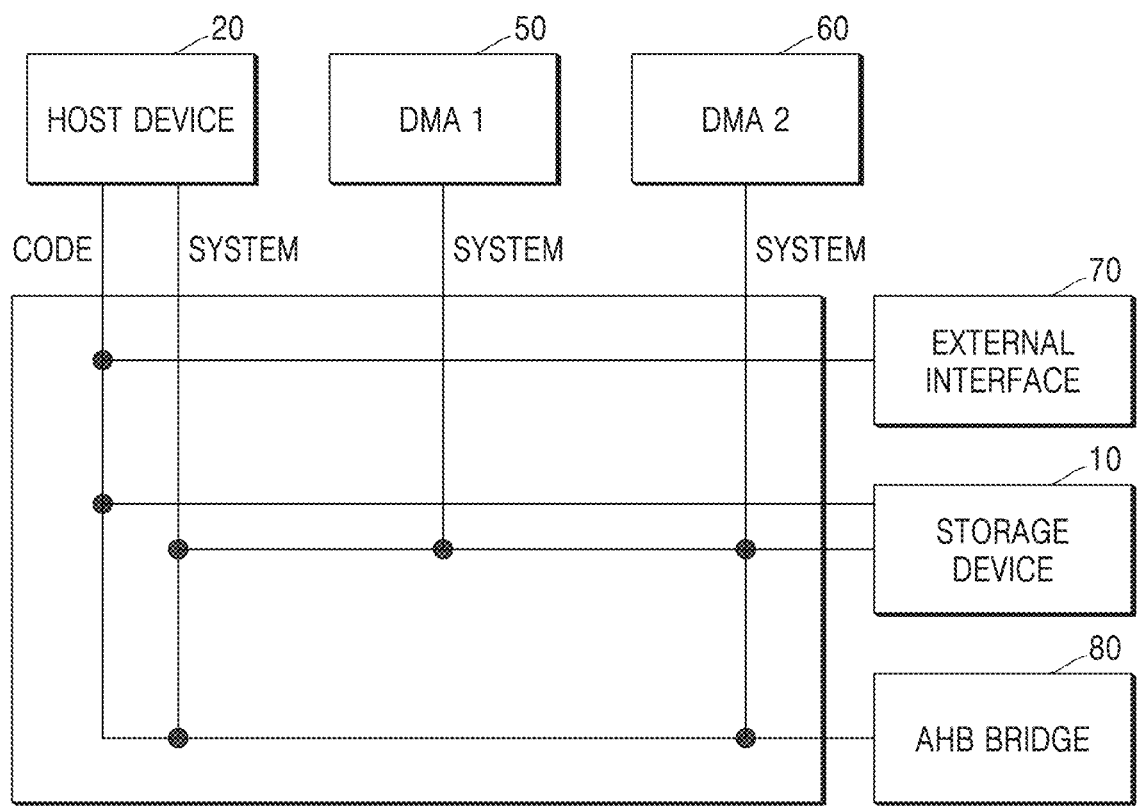
FIG. 7 is a diagram of a bus matrix of the inventive concepts.

FIG. 7 is a diagram of a bus matrix of the inventive concepts.

The bus matrix of the inventive concepts may include at least one channel configured to transmit a signal between at least one of master blocks and at least one of slave blocks. The master block may include a component to be a subject in bus utilization, and include the host device 20, the DMA 1 50, and the DMA 2 60. The slave block may include a component controlled by the master block, and may include the external interface 70, the storage device 10, and an advanced high-performance bus (AHB) bridge 80.

Referring to FIG. 7, the host device 20 may be connected to the storage device 10 via the code bus 40 and the system bus 30. The host device 20 may open the code bus 40 when the instruction information INST is requested based on the code address ADDR_CODE, and may open the system bus 30 when the data DATA is requested based on the data address ADDR_DATA. According to some example embodiments, the host device 20 may also receive the instruction information INST from the external interface 70 via the code bus 40. In addition, the host device 20 may receive the data DATA from the AHB bridge 80 via the system bus 30. The data DATA received from the AHB bridge 80 may be the data DATA requested by the host device 20 based on a peripheral address ADDR_PERI map of some example embodiments, including the example embodiments shown in FIG. 2.

The DMA 1 50 may store the instruction information INST in the storage device 10 via the system bus 30, and the DMA 2 60 may store the data DATA in the storage device 10 via the system bus 30. According to some example embodiments, the DMA 2 60 may also receive the data DATA from the AHB bridge 80 via the system bus 30.

Figure 8:
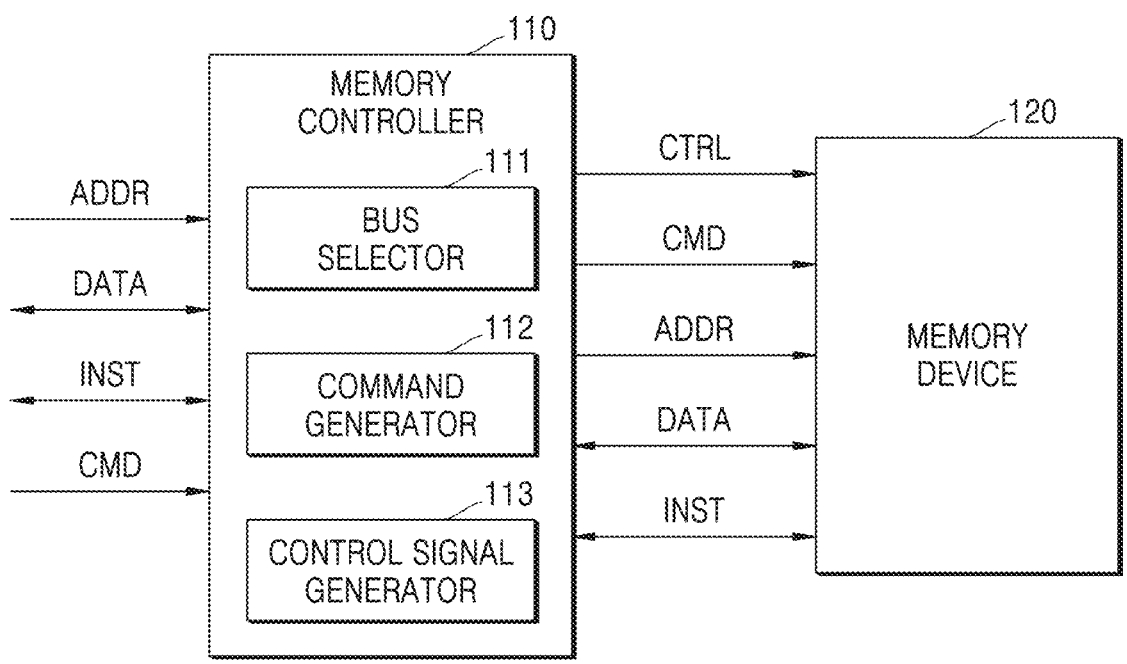
FIG. 8 is a diagram of a configuration of a storage device, according to some example embodiments.

FIG. 8 is a diagram of a configuration of the storage device 10, according to some example embodiments.

Referring to FIG. 8, the storage device 10 of the inventive concepts may include a memory controller 110 and the memory device 120, and the memory controller 110 may include a bus selector 111, a command generator 112, and a control signal generator 113. The bus selector 111, the command generator 112, and the control signal generator 113 may be configured with different hardware modules from each other, but the memory controller 110 of the inventive concepts is not limited thereto, and may be configured as hardware and a software module performing different functions from each other. As an example, the memory device 120 may be connected to the memory controller 110 via the plurality of channels, and the memory device 120 may include a volatile memory such as SRAM and DRAM, and a non-volatile memory such as a flash memory, RRAM, MRAM, and PRAM, etc.

The memory controller 110 may, in response to the case of receiving a read request from the host device 20, provide the address, the command CMD, and the control signal CTRL to the memory device 120 so that the data DATA or the instruction information INST stored in the memory device 120 is read. The memory device 120 may provide the data DATA or the instruction information INST to the host device 20 based on the address, the command CMD, and the control signal CTRL of the memory controller 110.

According to some example embodiments, the command generator 112 of the memory controller 110 may generate the command CMD to be provided to the memory device 120 based on the command CMD received from the host device 20, and the command CMD may include code information instructing read/write operations. The control signal generator 113 of the memory controller 110 may generate the control signal CTRL to be provided to the memory device 120, and the control signal CTRL may include the code information controlling the memory device 120 so that various types of voltages for performing the read/write operations are generated.

The memory controller 110 may access the memory region of the memory device 120 based on the address ADDR requested by the host device 20. According to some example embodiments, the memory controller 110 may access the memory region based on some address of the addresses ADDR requested by the host device 20. Some address may be an offset address of the addresses requested by the host device 20, and a configuration of the address is described in detail later with reference to FIG. 9.

In this case, the bus selector 111 of the memory controller 110 of the inventive concepts may select a bus to provide the instruction information INST to the host device 20 based on the address received from the host device 20. According to some example embodiments, a bus may be selected based on some address of the addresses requested by the host device 20. Some address may include, for example, a base address of the addresses requested by the host device 20.

When the base address corresponds to the code address ADDR_CODE, the bus selector 111 may provide the instruction information INST to the host device 20 via the code bus 40, and when the base address corresponds to the data address ADDR_DATA, the bus selector 111 may provide the instruction information INST to the host device 20 via the system bus 30.

Figure 9:
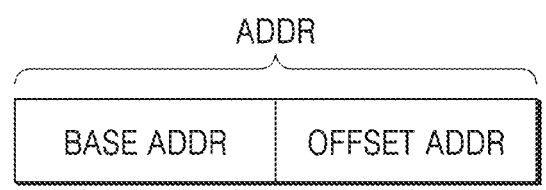
FIG. 9 is a diagram of an address according to some example embodiments.

FIG. 9 is a diagram of an address ADDR according to some example embodiments. As shown in FIG. 9, an address ADDR may comprise a base address BASE ADDR and an offset address OFFSET ADDR.

Referring to FIG. 9, the code address ADDR_CODE and the data address ADDR_DATA according to some example embodiments may be configured as a base address BASE ADDR and an offset address OFFSET ADDR. For example, the object data address ADDR_DATA as described herein and the object code address ADDR_CODE as described herein may each be configured with (e.g., may comprise) a respective base address BASE ADDR and offset address OFFSET ADDR. The offset address OFFSET ADDR may indicate the number of bytes up to an object memory region where information is loaded or stored, and the base address BASE ADDR may indicate an address map region corresponding to information. In other words, a memory controller according to some example embodiments may determine a memory region where information is stored or loaded by decoding the offset address OFFSET ADDR of the address. In this case, the memory controller may determine a bus to be opened by decoding the base address BASE ADDR of the address. For example, referring to FIGS. 8 and 9, the memory controller 110 (e.g., a bus selector 111 of the memory controller 110) may be configured to select a bus via which target instruction information is provided from the storage device 10 to the host device 20 based on a base address of an address requested from the host device 20 (e.g., based on a base address BASE_ADDR of the object code address ADDR_CODE corresponding to the target instruction information, where the object code address ADDR_CODE may be requested and/or specified in a request received at the storage device 10 from the host device 20), and the memory controller 110 may be configured to select a memory region to be located based an offset address of the address requested from and/or included in a request received from the host device (e.g., based on an offset address OFFSET_ADDR of the object code address ADDR_CODE included in the request from the host device 20 corresponding to the target instruction information). The memory controller 110 may be configured to store target instruction information in a particular memory region based on mapping the a particular data address ADDR_DATA (e.g., the object data address) and a particular code address ADDR_CODE (e.g., the object code address), which may be associated with the particular memory region, to the target instruction information.

A computing device according to some example embodiments may determine an entire address by adding the base address BASE ADDR and the offset address OFFSET ADDR. As an example, when the base address BASE ADDR is '0x0000_0000', and the offset address OFFSET ADDR is '0x1FFF_FFFF', the entire address may be '0x1FFF_FFFF'. The object data address ADDR_DATA as described herein and the object code address ADDR_CODE as described herein may be configured with (e.g., may comprise) identical offset addresses OFFSET_ADDR and different base addresses BASE ADDR from each other.

According to some example embodiments, the computing device of the inventive concepts may have an address, which has been mapped when the target instruction information is stored, different from an address when the target instruction information is read. However, when the address is configured with the same offset address OFFSET_ADDR, the computing device may store the target instruction information in the storage device 10 via the system bus 30 by using the data address ADDR_DATA, and may provide the target instruction information from the storage device 10 to the host device 20 via the code bus 40 by using the code address ADDR_CODE.

Accordingly, the computing device may access the memory region where the target instruction information is stored when the offset address OFFSET_ADDR is the same, even when the data address ADDR_DATA mapped at the time of storing the target instruction information is different from the code address ADDR_CODE requested at the time of loading the target instruction information.

As an example, when an address of '0x0000_0000' through '0x1FFF_FFFF' of the particular (or, alternatively, pre-defined) address map is allocated to the code address ADDR_CODE, and an address of '0x2000_0000' through '0x3FFF_FFFF' is allocated to the data address ADDR_DATA, the uppermost byte through third byte may become the base address, and other bytes except for the base address may become the offset address. Accordingly, when the uppermost byte through the third byte are '0x0' and '0x1', information may be transmitted via the code bus 40, and when the uppermost byte through the third byte are '0x2' and '0x3', information may be transmitted via the system bus 30.

However, the memory controller of the inventive concepts is not limited thereto, and the memory controller may decode the data address ADDR_DATA and the code address ADDR_CODE so that the data address ADDR_DATA mapped at the time of storing the target instruction information and the code address ADDR_CODE requested at the time of loading the target instruction information access the same memory region. In other words, the memory controller may be programmed to access one memory region even when different addresses are received.

Figure 10:
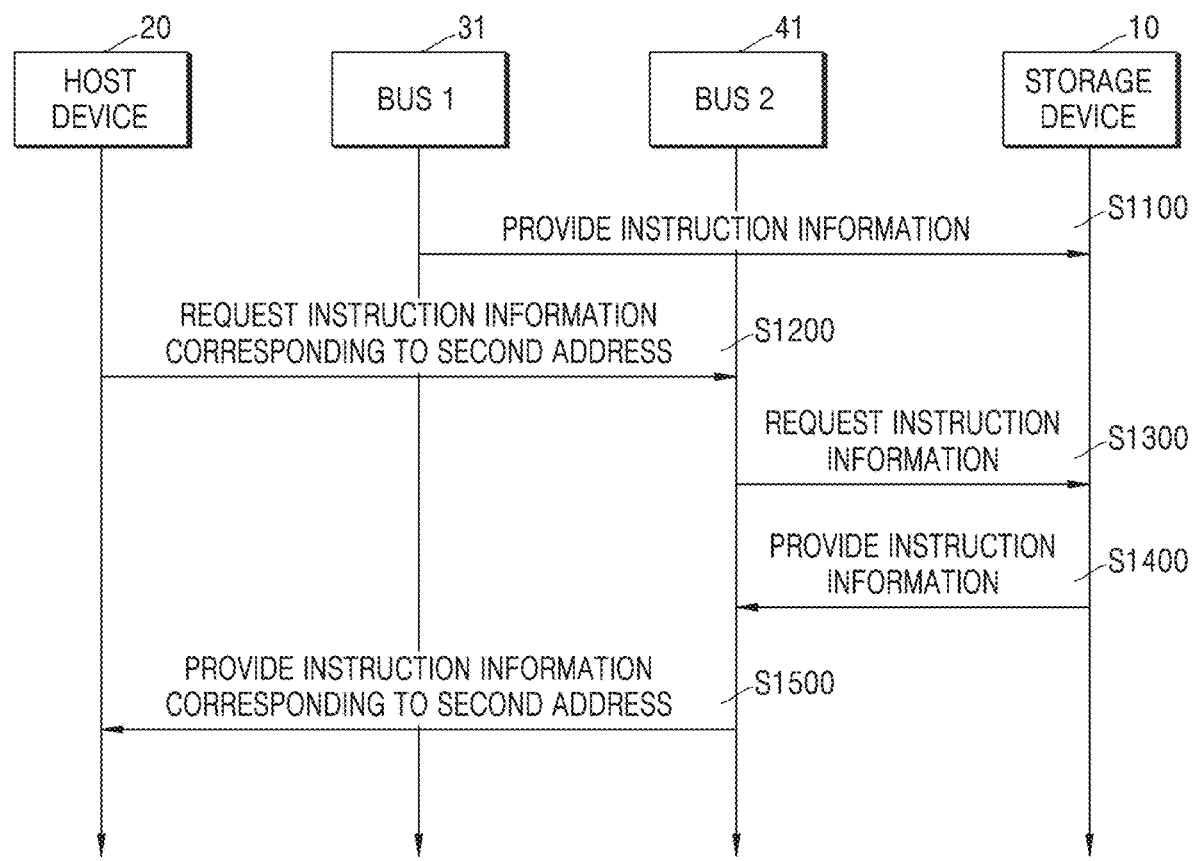
FIG. 10 is a flowchart of an operation method of a computing device, according to some example embodiments.

FIG. 10 is a flowchart of an operation method of a computing device, according to some example embodiments.

Referring to FIG. 10, in the computing device of the inventive concepts, the host device 20 and the storage device 10 may transceive the instruction information INST via a plurality of buses (e.g., a bus matrix, referring to FIG. 7) including a first bus 31 and a second bus 41. As an example, the first bus 31 may include a system bus, and the second bus 41 may include a code bus. In addition, information received via the first bus 31 and the second bus 41 may be transceived based on an address region corresponding to each bus.

Figure 12:
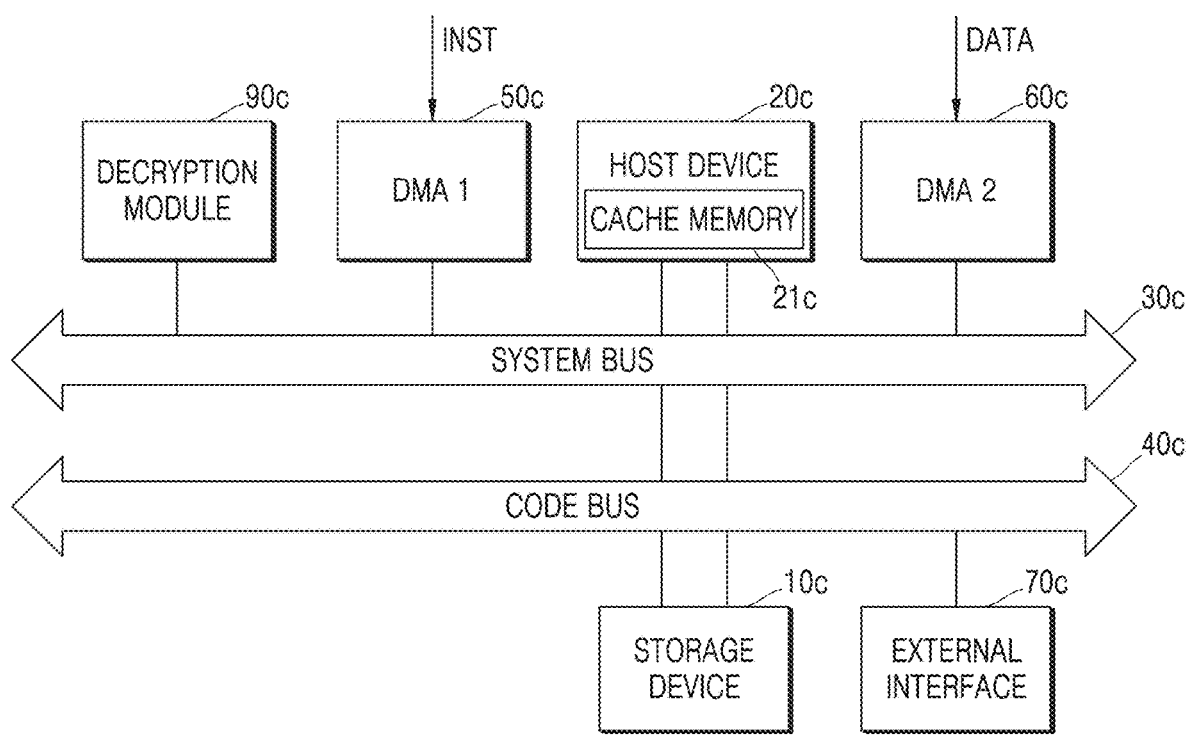
FIG. 12 is a block diagram of a computing device further including a decryption module, according to some example embodiments.

The first bus 31 may be connected to the storage device 10. The first bus 31 may be configured to transceive address information comprised in a first address map (e.g., data address map) of particular (or, alternatively, pre-defined) address maps. The second bus 41 may be configured to transceive address information included in a second address map (e.g., code address map) of the particular address maps. The first bus 31 may provide the instruction information INST to the storage device 10 (S1100). S1100 may be understood to include receiving target instruction information (e.g., object information), to which an object data address comprised in a data address map of particular address maps has been mapped, via a system bus (e.g., first bus 31), and storing the target instruction information in the storage device 10. Referring to FIG. 12, the receiving of the target instruction information via the system bus (e.g., first bus 31) may include generating the target instruction information based on decrypting information received from an external storage device (e.g., via a decryption module 90c). Referring to FIG. 12, the receiving of the target instruction information via the first bus 31 (e.g., system bus) at S1100 may include mapping the target instruction information to an object data address based on using at least one direct memory access device (e.g., DMA 1 50c).

In this case, a first address corresponding to the first bus 31 may be mapped to the instruction information INST by an external interface or a DMA, and the first bus 31 may provide the instruction information INST to the storage device 10. For example, where the instruction information INST includes or is included in "object information," the first bus 31 may be configured to stored object information received from an external storage device (which may include the instruction information INST) and mapped to a first address included in the first address map (e.g., object information to which the first address is mapped). The first address may be the object data address as described herein. The storing of the target instruction information to the storage device 10 at S1100 may include storing the target instruction information in an object memory region of the storage device 10 based on an offset address of the object data address (e.g., first address).

The host device 20 may request the instruction information INST corresponding to a second address from the second bus 41 (S1200). The second address may be the object code address as described herein. The first address may include an address indicating 'open' of the first bus 31, and the second address may include an address indicating 'open' of the second bus 41. In some example embodiments, the first address may be a data address ADDR_DATA, and the second address may be a code address ADDR_CODE. The first address and the second address may each include a respective base address and a respective offset address, and the first and second addresses may be configured with (e.g., include) identical offset addresses and different base addresses from each other. The second bus 41 may be configured to be selected as a bus via which the object information is to be provided to the host device 20 based on a base address of the second address. According to some example embodiments, the base address of the first address may be different from that of the second address, and the host device 20 may determine a bus to be open based on the base address of an address to be loaded.

The second bus 41 may request the instruction information INST from the storage device 10 based on the second address requested by the host device 20 (S1300). A memory controller of the storage device 10 may load the instruction information INST corresponding to the offset address by decoding the offset address of the second address. In this case, when the offset address of the first address is the same as the offset address of the second address, the memory controller may load the instruction information INST from a memory region that is the same as the memory region where the instruction information INST has been stored in operation S1100. S1200 and S1300 may collectively include requesting an object code address comprised in a code address map (e.g., the second address) from the host device 20 to the storage device 10 (e.g., via the second bus 41).

The storage device 10 may provide the instruction information INST corresponding to the second address to the second bus 41 (S1400), and the second bus 41 may provide the instruction information INST corresponding to the second address to the host device 20 (S1500). The second bus 41 may provide the "object information" from the storage device 10 to the host device 20, in response to the object information (e.g., instruction information INST) being requested from the host device (e.g., via S1200 and S1300) based on the second address (e.g., the object code address) that is separate (e.g., discrete) from the first address and included in the second address map. The first bus 31 may be configured to be controlled so that object information to which the first address has been mapped is stored in a particular memory region (e.g., an object memory region) of the storage device 10, and the second bus 41 may be configured to provide, to the host device 20, the object information stored in the object memory region based on the second address.

In other words, the computing device of the inventive concepts may store the instruction information INST by providing the instruction information INST to the storage device 10, and when transmission of the instruction information INST is requested via the second bus 41 discrete from the first bus 31, the host device 20 may receive the instruction information INST from the storage device 10 via the second bus 41. Accordingly, even when information is transceived according to a particular (or, alternatively, predefined) address map, the computing device of the inventive concepts may transmit information via a bus, which is better for storing or loading information.

S1400 and S1500 may collectively include providing the target instruction information (e.g., object information) in response to the request to the host device 20 via a code bus (e.g., second bus 41) that is separate from the system bus (e.g., first bus 31). The providing at S1400 and S1500 may include determining a bus, via which the target instruction information (e.g., object information) is to be provided base on a base address of the object code address (e.g., second address), as the code bus (e.g., second bus 41), and selecting a memory region to be loaded from the storage device 10 based on an offset address of the object code address (e.g., the second address). The providing of the target instruction information to the host device 20 may include accessing the target instruction information from the object memory region of the storage device 10 based on the offset address of the object code address (e.g., second address). Referring to FIG. 12, the providing at S1400 and S1500 may include at least temporarily storing the target instruction information provided via the code bus (e.g., second bus 41) to a cache memory (e.g., cache memory 21*c*) comprised in the host device 20.

Figure 11A:
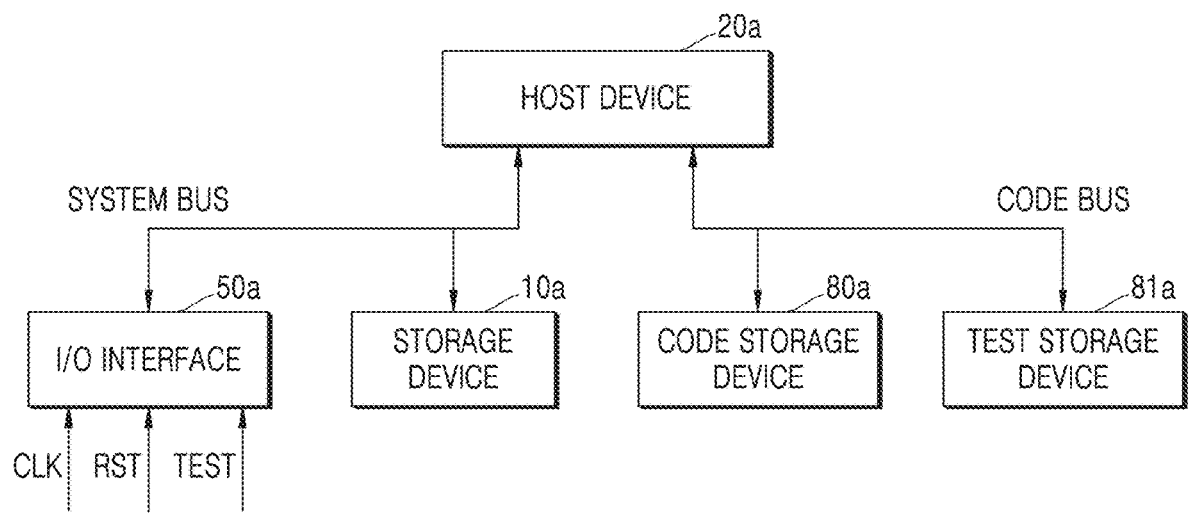
FIG. 11A is a block diagram of a configuration of a test device, according to some example embodiments.
Figure 11B:
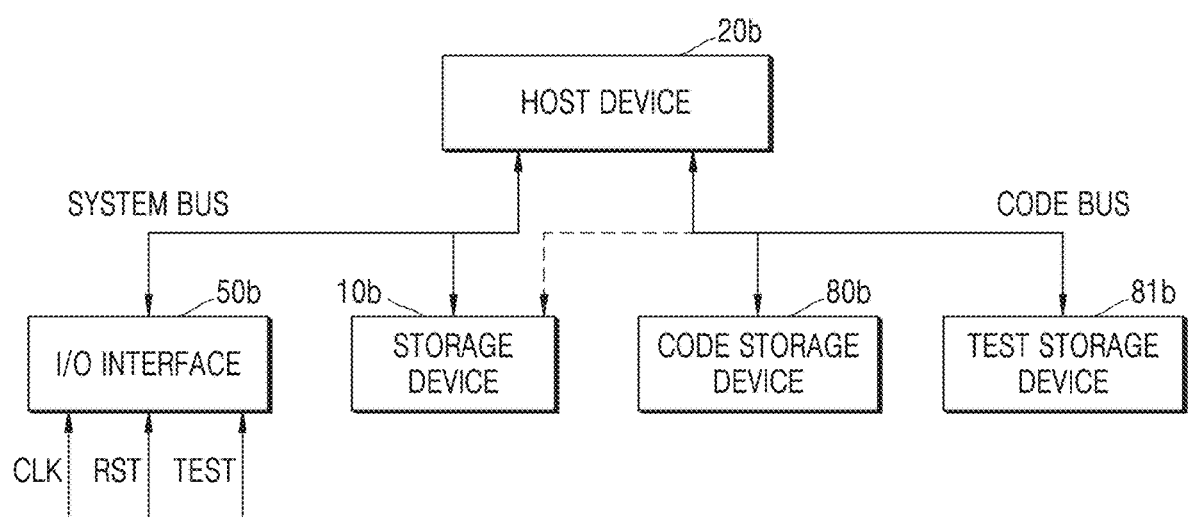
FIG. 11B is a block diagram of a configuration of a test device, according to some example embodiments.

FIG. 11A is a block diagram of a configuration of a test device, according to some example embodiments, and FIG. 11B is a block diagram of a configuration of a test device, according to some example embodiments.

Referring to FIG. 11A, the test device may include a storage device 10*a*, a code storage device 80*a*, a host device 20*a*, an input/output interface 50*a*. The input/output interface 50*a* may receive from an external device and provide to the test device a clock signal CLK, a reset signal RST, and a test code TEST.

The test device according to some example embodiments may provide test boot code from the code storage device 80*a* to the host device 20*a* via a code bus. After the host device 20*a* receives the test boot code, the input/output interface 50*a* may provide the test code TEST to the storage device 10*a* via a system bus, and the host device 20*a* may perform a test on a test storage device 81*a* by loading the test code TEST from the storage device 10*a*. A test on the test storage device 81*a* may be, for example, an electrical die sorting (EDS) test or a final test (FT), which is performed after packaging of the storage device 10*a*.

The host device 20*a* according to some example embodiments may perform a test by loading the test code TEST from the storage device 10*a* via the system bus, and the system bus may have a slow performance speed of code due to a relatively slow information fetching speed, compared to the code bus.

To the contrary, referring to FIG. 11B, the test device may load the test code TEST from a storage device 10*b* via the code bus. Accordingly, the test device of the inventive concepts may perform a test on a test storage device 81*b* at a faster speed than the test device according to some example embodiments.

The host device 20*b* according to some example embodiments may receive the test code TEST via the code bus based on the code address ADDR_CODE included in the code address map of the particular (or, alternatively, predefined) address maps, and may receive the test code TEST via the system bus discrete from the code bus based on the data address ADDR_DATA included in the data address map. The storage device 10*b* may store object test code via an input/output interface 50*b* via the system bus, and when the code address ADDR_CODE corresponding to the object test code is requested by the host device 20*b*, the storage device 10*b* may provide the object test code to the host device 20*b* via the code bus.

FIG. 12 is a block diagram of a computing device further including a decryption module 90*c*, according to some example embodiments.

Referring to FIG. 12, the computing device may further include the decryption module 90*c* for decrypting the instruction information INST. The decryption module 90*c* may decrypt information received from a DMA 1 50*c* and provide the decrypted information back to the DMA 1 50*c*, and the DMA 1 50*c* may map the decrypted instruction information INST to the data address ADDR_DATA and provide the mapped instruction information INST to a storage device 10*c*. In this case, the decryption module 90*c* may be connected to a system bus 30*c*, and exchange information with the DMA 1 50*c*.

As an example, the decryption module 90*c* may include an advanced encryption standard (AES) engine. The AES engine may perform encryption and decryption of the data DATA by using an AES algorithm, and may receive information from the DMA 1 50*c*. The decryption module 90*c* may generate the instruction information INST by (e.g., based on) decrypting information transmitted from the DMA 1 50*c* (which may be and/or include information received from an external storage device) by using an encryption key identical to an encryption key used for encrypting the instruction information INST. The instruction information INST may be transmitted from the decryption module 90*c* to the DMA 1 50*c*, and may be stored after being mapped to the data address ADDR_DATA. Referring back to FIG. 10, the first bus 31 (e.g., system bus 30*c*) may be connected to the decryption module 90*c* that is configured to generate object information (e.g., instruction information INST) based on decrypting information received from the external storage device. Still referring back to FIG. 10, the first bus 31 (e.g., system bus 30*c*) may be connected to at least one direct memory access device (e.g., DMA 1 50*c*) that is configured to map object information (e.g., the instruction information INST) that is received from an external storage device to a first address (e.g., data address ADDR_DATA).

In addition, a host device 20*c* may further include a cache memory 21*c*, also referred to herein as an instruction information cache memory, which at least temporarily stores the instruction information INST received at the host device 20*c* via the code bus 40*c*. The cache memory 21*c* may store the instruction information INST fetched from the storage device 10*c* via a code bus 40*c*, and may provide the instruction information INST for computing the data DATA as a processor of the host device 20*c*. Referring back to FIG. 10, the second bus 41 (e.g., code bus 40*c*) may be comprised in the host device 20, and the second bus 41 (e.g., code bus 40*c*) may be configured to provide object information (e.g., instruction information INST) to an instruction information cache memory (e.g., cache memory 21c) which is configured to at least temporarily store data.

Figure 13:
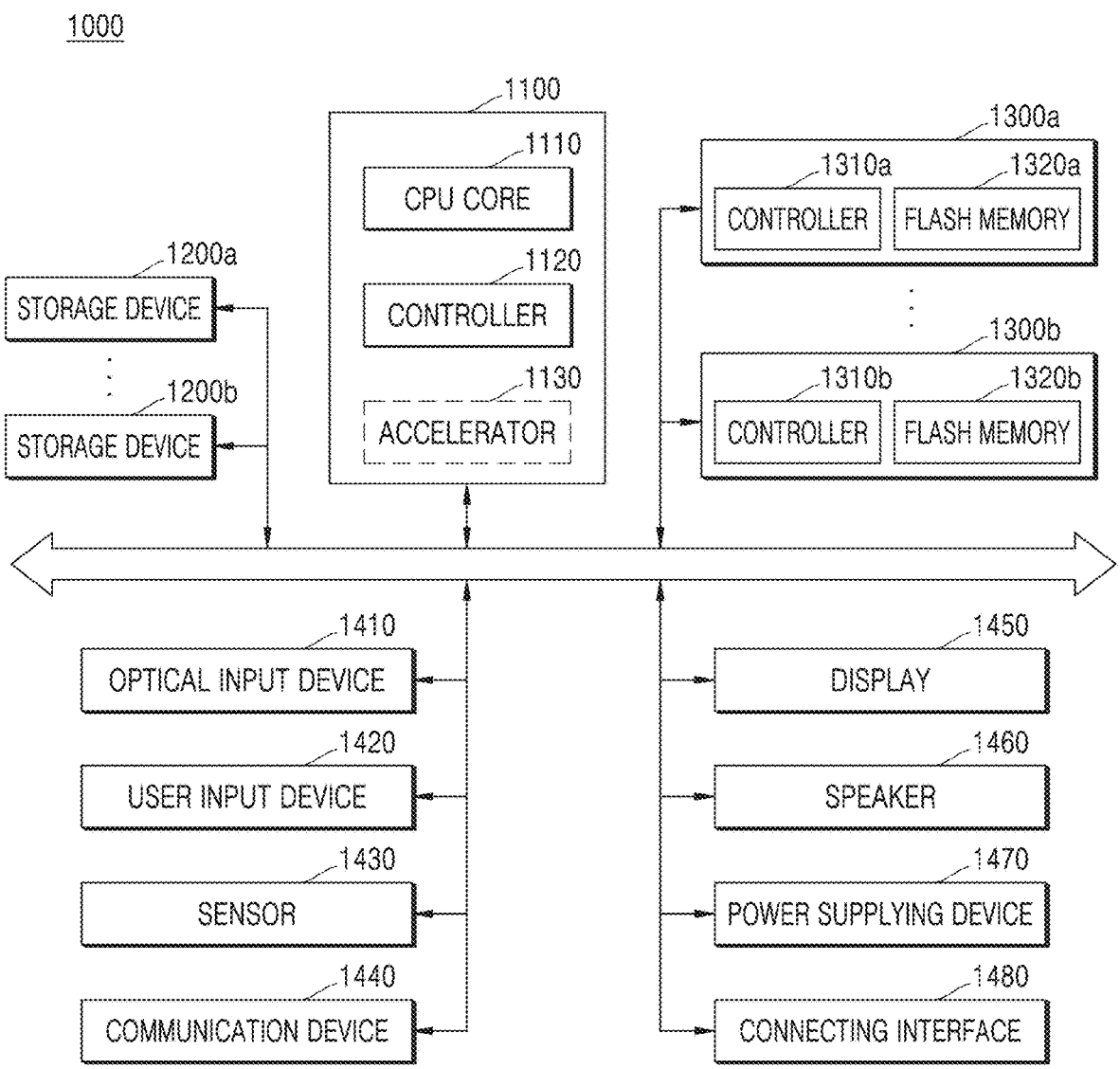
FIG. 13 is a diagram of a computing device according to some example embodiments.

FIG. 13 is a diagram of a computing system 1000 according to some example embodiments.

The computing system 1000 of FIG. 13 may basically include a mobile system such as a mobile phone, a smartphone, a tablet personal computer (PC), a wearable device, a health care device, and an Internet of Things (IoT) device. However, the computing system 1000 of FIG. 13 is not necessarily limited to the mobile system, and may also include a PC, a laptop computer, a server, a media player, or an automotive device such as a navigation device.

Referring to FIG. 13, the computing system 1000 may include a host device 1100, storage devices 1200a and 1200b, and non-volatile storage devices 1300a and 1300b, and in addition, may include one or more of an optical input device 1410 (e.g., image capturing device), a user input device 1420, a sensor 1430, a communication device 1440, a display 1450, a speaker 1460, a power supplying device 1470, and a connecting interface 1480.

The host device 1100 may control an overall operation of the computing system 1000, and in more detail, operations of other components constituting the computing system 1000. The host device 1100 may be implemented as a general purpose processor, a dedicated processor, an application processor, etc.

The host device 1100 may include one or more central processing unit (CPU) cores 1110, and may further include a controller 1120 for controlling the storage devices 1200a and 1200b and/or the non-volatile storage devices 1300a and 1300b. According to some example embodiments, the host device 1100 may further include an accelerator block 1130, which is a dedicated circuit for a high-speed data computation such as an artificial intelligence (AI) data computation. The accelerator block 1130 may include a graphics processing unit (GPU), a neural processing unit (NPU), and/or data processing unit (DPU), or the like, and may be implemented with a discrete chip, which is physically independent of other components.

The storage devices 1200a and 1200b may be used as a main memory device of the computing system 1000, and may include a volatile memory such as SRAM and/or DRAM, but may also include a non-volatile memory such as a flash memory, PRAM, and/or RRAM. The storage devices 1200a and 1200b may be implemented in an identical package with the host device 1100.

The non-volatile storage devices 1300a and 1300b may store data regardless of a power supply, and may have a relatively larger storage capacity than the storage devices 1200a and 1200b. The non-volatile storage devices 1300a and 1300b may include storage controllers 1310a and 1310b, and flash memories 1320a and 1320b, which store data under the control of the storage controllers 1310a and 1310b. The flash memories 1320a and 1320b may include a V-NAND flash memory having a 2-dimensional (2D) or 3-dimensional (3D) structure, but may also include a non-volatile memory of different types such as PRAM and/or RRAM.

The non-volatile storage devices 1300a and 1300b may be also included in the computing system 1000 in a physically separated state from the host device 1100, and may be also implemented in an identical package to the host device 1100. In addition, the non-volatile storage devices 1300a and 1300b may have the same shape as a shape of a solid state drive (SSD) or a memory card, and thus, may be also detachably combined with other components of the computing system 1000 via an interface such as the connecting interface 1480 to be described later. The non-volatile storage devices 1300a and 1300b may include a device to which standard convention such as a universal flash storage (UFS), an embedded multimedia card (eMMC), and non-volatile memory express (NVMe) is applied, but are not necessarily limited thereto.

According to some example embodiments, the storage devices 1200a and 1200b and the host device 1100 may transceive information via a plurality of buses, and the computing system 1000 may transmit information stored in the non-volatile storage devices 1300a and 1300b to the storage devices 1200a and 1200b via DMA. In this case, the host device 1100 may receive instruction information via a code bus based on a code address included in a code address map of particular (or, alternatively, pre-defined) address maps, and may receive data via a system bus discrete from a code bus based on a data address included in a data address map. The storage devices 1200a and 1200b may store instruction information via the system bus, and when an object code address corresponding to the instruction information is requested by the host device 1100, may provide target instruction information to the host device 1100 via the code bus.

The optical input device 1410 may capture a static image or a video image, and may include a camera, a camcorder, and/or a webcam, etc.

The user input device 1420 may receive various types of data input from a user of the computing system 1000, and may include a touch pad, a keypad, a keyboard, a mouse, and/or a microphone.

The sensor 1430 may sense various types of physical amount obtained from the outside of the computing system 1000, and may convert the sensed physical amount into an electrical signal. The sensor 1430 may include a temperature sensor, a pressure sensor, an illuminance sensor, a location sensor, an acceleration sensor, a biosensor, and/or a gyroscope.

The communication device 1440 may perform transmission and receiving of a signal between other devices outside the computing system 1000 according to various communication conventions. The communication device 1440 may be implemented by including an antenna, a transceiver, and/or a MODEM, etc.

The display 1450 and the speaker 1460 may function as output devices outputting visual information and audio information to a user of the computing system 1000, respectively.

The power supplying device 1470 may properly convert power supplied from a battery (not illustrated) embedded in the computing system 1000 and/or an external power source, and provide the converted power to each component of the computing system 1000.

The connecting interface 1480 may provide a connection between the computing system 1000 and an external device, which is connected to the computing system 1000 and exchanges data with the computing system 1000. The connecting interface 1480 may be implemented in various interface methods such as advanced technology attachment (ATA), serial ATA (SATA), external SATA (e-SATA), small computer system interface (SCSI), serial attached SCSI (SAS), peripheral component interconnect (PCI), PCI express (PCIe), NVM express (NVMe), IEEE 1394, universal serial bus (USB), a secure digital (SD) card, a multimedia card (MMC), an embedded MMC (eMMC), universal flash storage (UFS), embedded UFS (eUFS), and a compact flash (CF) card interface.

As described herein, any devices, systems, electronic devices, blocks, modules, units, controllers, circuits, and/or portions thereof according to any of the example embodiments, and/or any portions thereof (including, without limitation, computing device 1, storage device 10, host device 20, system bus 30, code bus 40, DMA 1 50, DMA 2 60, external interface 70, AHB bridge 80, memory controller 110, bus selector 111, command generator 112, control signal generator 113, memory device 120, first bus 31, second bus 41, storage device 10*a*, host device 20*a*, I/O interface 50*a*, code storage device 80*a*, test storage device 81*a*, storage device 10*b*, host device 20*b*, I/O interface 50*b*, code storage device 80*b*, test storage device 81*b*, storage device 10*c*, host device 20*c*, cache memory 21*c*, system bus 30*c*, code bus 40*c*, DMA 1 50*c*, DMA 2 60*c*, external interface 70*c*, decryption module 90*c*, computing system 1000, storage device 1200*a*, storage device 1200*b*, host device 1100, CPU core 1110, controller 1120, accelerator block 1130, non-volatile storage devices 1300*a* and 1300*b*, storage controllers 1310*a* and 1310*b*, flash memories 1320*a* and 1320*b*, optical input device 1410, user input device 1420, sensor 1430, communication device 1440, display 1450, speaker 1460, power supplying device 1470, and connecting interface 1480, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, electronic devices, blocks, modules, units, controllers, circuits, and/or portions thereof according to any of the example embodiments, and/or any portions thereof.

Any of the memories and/or storage devices described herein, including, without limitation, storage device 10, memory device 120, storage device 10*a*, storage device 10*b*, storage device 10*c*, test storage device 81*a*, test storage device 81*b*, cache memory 21*c*, storage devices 1200*a* and 1200*b*, non-volatile storage devices 1300*a* and 1300*b*, flash memories 1320*a* and 1320*b*, or the like, may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the inventive concepts have been particularly shown and described with reference to some example embodiments thereof, it will be understood that various changes in form and details may be made therein without departing from the spirit and scope of the following claims.

What is claimed is:

1. A computing device, comprising:
a host device configured to
receive instruction information via a code bus based on a code address included in a code address map of particular address maps, and
receive data via a system bus that is separate from the code bus based on a data address included in a data address map; and
a storage device configured to
receive target instruction information from an external storage device via the system bus,
store target instruction information, and
provide the target instruction information to the host device via the code bus in response to a request from the host device for an object code address included in the code address map and corresponding to the target instruction information.

2. The computing device of claim 1, wherein
an object data address included in the data address map is mapped to the target instruction information.

3. The computing device of claim 2, wherein
each address comprises a respective base address and a respective offset address, and
the object code address and the object data address are configured with identical offset addresses and different base addresses from each other.

4. The computing device of claim 3, wherein the storage device comprises a memory controller configured to
select a bus via which the target instruction information is provided to the host device based on a base address of an address requested from the host device, and
select a memory region to be loaded based on an offset address of the address requested from the host device.

5. The computing device of claim 4, wherein the memory controller is configured to store the target instruction information in one memory region based on mapping the object data address and the object code address to the target instruction information.

6. The computing device of claim 1, wherein the host device comprises an instruction information cache memory that is configured to at least temporarily store the instruction information received via the code bus.

7. The computing device of claim 1, further comprising:
a decryption module configured to generate the target instruction information based on decrypting information received from the external storage device.

8. The computing device of claim 1, further comprising:
at least one direct memory access device configured to provide, to the storage device, the instruction information and the data from the external storage device.

9. The computing device of claim 8, wherein the at least one direct memory access device is configured to
map the instruction information and the data received from the external storage device to the data address, and
provide the instruction information and the data that are mapped to the data address to the storage device via the system bus.

10. A bus matrix, comprising:
a first bus connected to a storage device and configured to transceive address information comprised in a first address map of particular address maps; and
a second bus connected to the storage device and configured to transceive address information included in a second address map of the particular address maps, wherein the first bus is configured to store, in the storage device, object information received from an external storage device and mapped to a first address included in the first address map, wherein the second bus is configured to provide the object information from the storage device to a host device, in response to the object information being requested from the host device based on a second address that is separate from the first address and included in the second address map.

11. The bus matrix of claim 10, wherein
the first address and the second address each include a respective base address and a respective offset address, and
the first address and the second address are configured with identical offset addresses and different base addresses from each other.

12. The bus matrix of claim 11, wherein the second bus is configured to be selected as a bus via which the object information is to be provided to the host device based on a base address of the second address.

13. The bus matrix of claim 10, wherein
the first bus is configured to be controlled so that the object information to which the first address has been mapped is stored in an object memory region of the storage device,
the second bus is configured to provide, to the host device, the object information stored in the object memory region based on the second address.

14. The bus matrix of claim 10, wherein
the second bus is comprised in the host device, and
the second bus is configured to provide the object information to an instruction information cache memory, the instruction information cache memory configured to at least temporarily store data.

15. The bus matrix of claim 10, wherein the first bus is connected to a decryption module configured to generate the object information based on decrypting information received from the external storage device.

16. The bus matrix of claim 10, wherein the first bus is connected to at least one direct memory access device that is configured to map the object information received from the external storage device to the first address.

17. An operation method of a computing device that includes a host device and a storage device, the operation method comprising:
receiving object information, to which an object data address comprised in a data address map of particular address maps has been mapped, from an external storage device via a system bus;
storing the object information in the storage device;
requesting an object code address comprised in a code address map, from the host device to the storage device; and
providing the object information from the storage device to the host device via a code bus that is separate from the system bus in response to the request.

18. The operation method of claim 17, wherein
each address comprises a respective base address and a respective offset address, and
the object code address and the object data address are configured with identical offset addresses and different base addresses.

19. The operation method of claim 18, wherein the providing of the object information to the host device comprises:
determining a bus, via which the object information is to be provided based on a base address of the object code address, as the code bus; and
selecting a memory region to be loaded from the storage device based on an offset address of the object code address.

20. The operation method of claim 19, wherein
the storing of the object information to the storage device comprises storing the object information in an object memory region of the storage device based on the offset address of the object data address,
wherein the providing of the object information to the host device comprises accessing the object information from the object memory region of the storage device based on the offset address of the object code address.

* * * * *